United States Patent [19]

Mowery

[11] 4,060,252

[45] Nov. 29, 1977

[54] BALL TYPE TRANSFER APPARATUS

[76] Inventor: Geoffrey John Mowery, 27349 Miles Rd., Chagrin Falls, Ohio 44022

[21] Appl. No.: 631,975

[22] Filed: Nov. 14, 1975

Related U.S. Application Data

[63] Continuation-in-part of Ser. No. 521,547, Nov. 6, 1974, abandoned.

[51] Int. Cl.² .............................................. B62B 1/00
[52] U.S. Cl. .............................. 280/79.1 R; 16/18 R; 193/35 MD; 214/38 D; 308/200; 308/6 R
[58] Field of Search ............... 308/202, 6 R, 200, 194, 308/199, 184, 189 R; 280/79.1 R, 79.1, 638; 16/18, 21, 26; 296/1 M; 297/DIG. 4; 214/38 D, 84; 193/35 MD; 105/463–465; 56/660; 108/51.1, 52.1; 301/1, 2, 5 R, 5.3, 5.7; 248/423, 430, 176

[56] References Cited

U.S. PATENT DOCUMENTS

| 1,214,416 | 1/1917 | Biddle | 16/26 |
| 3,026,153 | 3/1962 | Judd, Jr. | 308/202 |
| 3,381,330 | 5/1968 | Annger | 16/21 |
| 3,514,001 | 5/1970 | Meritt et al. | 280/79.1 R |
| 3,781,947 | 1/1974 | Germer | 105/464 |

Primary Examiner—Richard A. Bertsch
Attorney, Agent, or Firm—Fay & Sharpe

[57] ABSTRACT

A transfer apparatus or mat comprised of a generally flat plastic base member having a plurality of ball members received in and extending outwardly from the bottom face thereof in a predetermined pattern. Ball bearing members are received between the ball members and base to facilitate ease of rolling ball members relative to the base. The mat or transfer apparatus provides easy transport means along a ground or floor surface for machines and other objects which are placed on the top face thereof. Means are provided for interconnecting a plurality of the mats in a side-by-side relationship to increase the size of the transfer surface as may be necessary when moving large objects.

8 Claims, 8 Drawing Figures

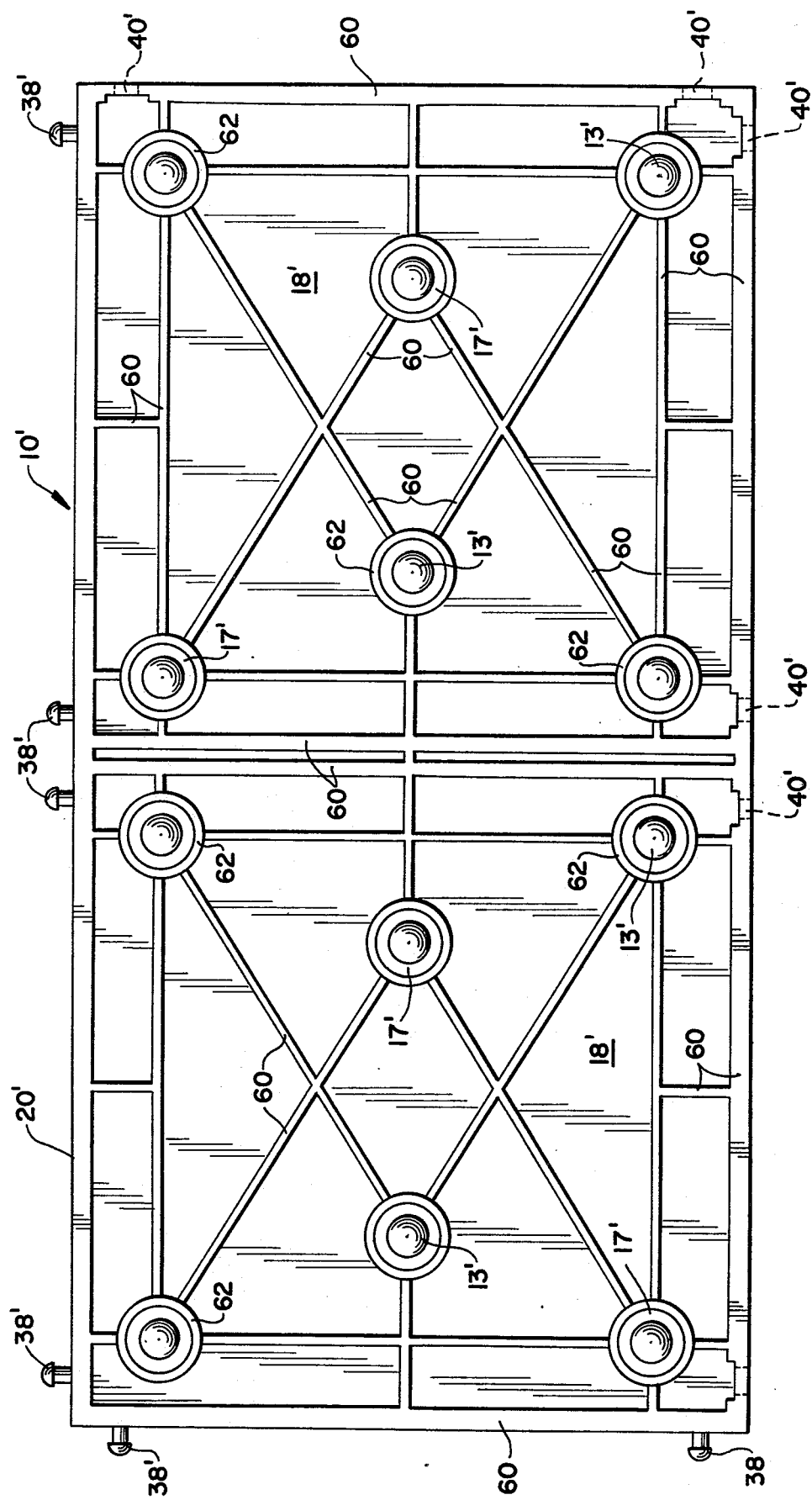

BALL TYPE TRANSFER APPARATUS

BACKGROUND OF THE INVENTION

This application is a continuation-in-part application of application Ser. No. 521,547, filed Nov. 6, 1974, now abandoned.

This invention pertains to the art of object support apparatus and more particularly to support and transfer apparatus.

The invention is particularly applicable to a ball type transfer apparatus of the type particularly adapted to transfer articles or objects from one location to another and will be described with particular reference thereto. However, it will be appreciated to those skilled in the art that the invention has broader applications and may be conveniently and advantageously employed in other environments.

In many article-handling applications, pallets or skids are used. Such pallets or skids are typically designed with a top surface on which a wide variety of articles to be moved or stored are placed, a bottom surface which rests on the floor or ground, and an open framework between the top and bottom surfaces. The open framework permits a fork lift apparatus to be used for moving the pallets or skids from one location to another. However, such pallets or skids have several disadvantages.

One disadvantage is that pallets or skids cannot be moved manually. As such, a mechanical fork lift apparatus is generally used to lift or raise them above the floor or ground surface and then transport them to a new location. As a result of the requirement that the pallets or skids be lifted from the floor or ground surface, there is a risk that the objects being transported will fall or be vibrated off of the pallets or skids. Thus, transporting objects by this means can be dangerous to persons working in close proximity to those pallets or skids being moved. Moreover, articles or objects which fall or are vibrated from their supports can be substantially damaged or ruined.

Another disadvantage of pallets and skids is that the use of fork lift apparatus can be time-consuming. For example, it is often necessary to adjust the transverse distance between the forks on the lift apparatus to align them with receiving openings in a pallet framework before the pallet can be moved. Also, before a pallet can be properly moved, the person operating the fork lift apparatus must take steps to insure that the load is properly balanced to eliminate loss and/or damage to the load during transport.

Further, pallets and skids must typically be approached from a particular direction so that the forks of the lift will engage the proper open areas of the pallet framework. This requirement greatly decreases the flexibility of such article support or handling equipment. Still another disadvantage associated with this type of article support apparatus is that the size of the articles to be transported is limited by the fact that pallets and skids are generally manufactured in standard sizes and as such, articles substantially larger than a single pallet or skid must be moved by other means.

Some roller type supports and transfer apparatus are known in the art. Such apparatus have, however, been extremely cumbersome and complicated in design and construction so as to be fairly expensive and undesirable for use a convenient storage support. Moreover, some of the prior roller type supports and transfer apparatus have included exposed roller means on both the top and bottom surfaces of the base member. This type of structure is undesirable for purposes of storing articles or objects for a period of time since the articles or objects could be inadvertently rolled off of the supporting surface. Prior roller type supports or transfer apparatus also did not provide means for conveniently interconnecting a plurality of the apparatus together in order to achieve the desired dimensions of a support surface for those articles or objects involved.

The present invention contemplates a new and improved apparatus which overcomes all of the above referred to problems and others and provides a new ball type transfer apparatus which is simple in design, economical to manufacture, economical to use as a support and/or transfer mechanism and which is readily adapted to use with many sizes of loads in any number of environments.

BRIEF DESCRIPTION OF THE INVENTION

In accordance with the present invention, a ball type transfer apparatus is provided which includes a generally planar base member having a top surface on which articles may be placed for storage or transportation. The base member bottom surface includes a plurality of spaced-apart ball bearing cavities defining a pattern. Each cavity includes means for receiving a bearing race and means for resiliently capturing a majority of a main ball bearing member therein. The plurality of ball bearings in the bottom surface of the planar base member facilitates the base member being placed into rolling engagement with the ground or floor surface beneath it for ease of storing or transporting those articles placed on the base member top surface.

In accordance with another aspect of the invention, the ball bearing cavities each define a ball race chamber at the innermost ends thereof and includes a resilient chamfered edge adjacent the outermost end with a majority of each ball bearing member being received in the associated cavity between the ball race chamber and the resilient chamfered edge.

In accordance with a limited aspect of the present invention, the ball bearing cavities each include first and second ball races. The outer periphery of the main bearing is in simultaneous rolling engagement with the outer periphery of both the first and second ball races which significantly increases the weight bearing capacity of the bearing mat.

In accordance with another limited aspect of the present invention, the base member includes a plurality of spaced-apart ball bearing bosses which extend outwardly from the bottom surface of the base member and have the ball bearing cavities disposed therein. In addition, strengthening ribs are included to extend outwardly from the base member bottom surface in order to strengthen the overall transfer apparatus.

In accordance with yet another limited aspect of the present invention, each ball bearing boss receives a separate bearing assembly housing in the bearing cavity. Each bearing assembly includes the main bearing, bearing race and capturing means therein as a part thereof.

In accordance with a still further limited aspect of the invention, each cavity includes a wiper member therein which prevents foreign matter from contacting the bearing race.

In accordance with another aspect of the invention, the base member includes means for interchangeably interlocking other similar base members thereto to facilitate the fabrication of ball type transfer apparatus of different dimensions to suit particular needs. The interlocking means being comprised of locking pins located on two adjacent sides of the base member and pin receiving sockets located on the other two sides of the base member opposite the locking pins.

The principle object of the present invention is the provision of a new and improved bearing mat or ball type transfer apparatus which is simple in design and easy to manufacture.

Another object of the present invention is the provision of a new and improved bearing mat or ball type transfer apparatus which permits omni-directional movement of the transfer apparatus.

Still another object of the invention is the provision of a new and improved bearing mat or ball type transfer apparatus which facilitates safe moving and storing of heavy objects in shipping rooms, offices and the like.

Still a further object of the present invention is the provision of a new and improved bearing mat or ball type transfer apparatus which may be easily interconnected with other similar apparatus to vary the size of the load support surface.

Another object of the present invention is the provision of a new and improved bearing mat or ball type transfer apparatus which is readily adapted to use in a plurality of environments.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 2 is a bottom view of an alternative structure for the ball type transfer apparatus;

DESCRIPTION OF THE PREFERRED EMBODIMENTS

Figure 1:
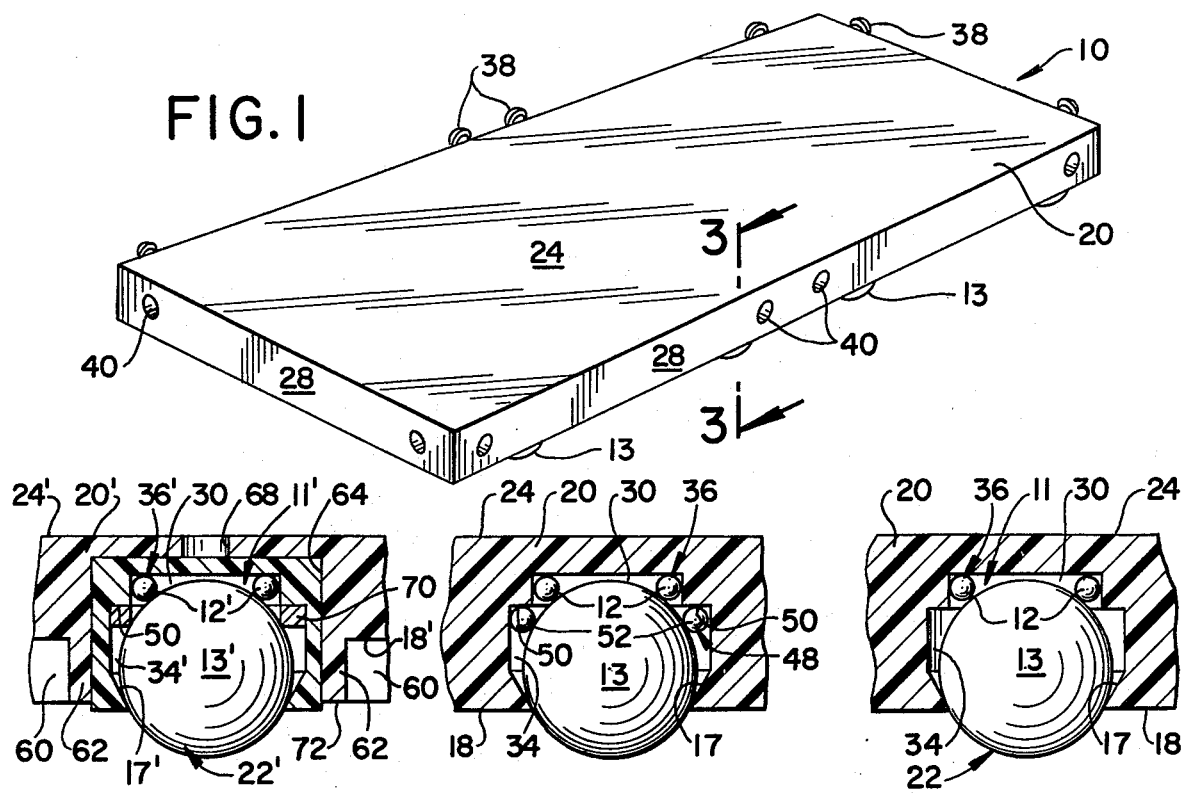
FIG. 1 is a perspective view of the ball type transfer apparatus which incorporates the concepts of the subject invention therein.
Figures 3, 4, 5, 7:
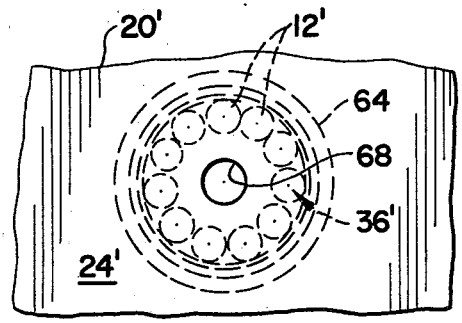
FIG. 3 is a cross-sectional view of a portion of the apparatus shown in FIG. 1 taken along lines 3—3 therein.
FIG. 4 is a cross-sectional view similar to that of FIG. 3 showing an alternative embodiment incorporating the concepts of the invention.
FIG. 5 is a cross-sectional view similar to that of FIG. 3 showing yet another alternative embodiment incorporating the concepts of the invention.
FIG. 7 is a plan view of the embodiment of FIG. 5.

Referring now to the drawings wherein the showings are for purposes of illustrating preferred embodiments of the invention only and not for purposes of limiting the same, FIGS. 1 and 3 show a bearing mat or ball type transfer apparatus 10 which is particularly adapted for transfering bodies along a surface between first and second spaced locations. The bearing mat 10 includes a base member 20 which contains a plurality of spaced-apart ball bearing cavities 11, each of which contains a ball bearing means 22 captured in the ball bearing cavity 11 such that the base member 20 is in rolling engagement with the ground surface beneath the ball type transfer apparatus 10.

The base member 20 is a generally planar member preferably constructed of a plastic material including a top surface 24, a bottom surface 18, and a continuous sidewall 28. Suitable plastic materials for this purpose are, for example, phenol formaldehyde, polyethylene, polypropylene, and acrylic polymers and co-polymers. Other materials and plastics could also be advantageously employed without departing from the intent or scope of the present invention. The top and bottom surfaces 24 and 18 respectively, are opposed and substantially parallel to each other. The bottom surface 18 includes a plurality of spaced-apart ball bearing cavities 11, each of which contains a ball bearing means 22 which is freely rotatable relative to the base member 20. In the preferred embodiment, the ball bearing cavities 11 are molded in the base member 20; however, any other method of forming the cavities 11, such as by conventional machining methods, may also be used.

Each of the ball bearing cavities 11 is defined by a ball race chamber 30 located at one end of the cavity 11, a resilient chamfered edge 17 located at the opposite end of the cavity 11, and a main bearing chamber 34 located between the ball race chamber 30 and the resilient chamfered edge 17. The resilient chamfered edge 17 is located at the bottom surface 18 of the base member 20 and extends inwardly from the bottom surface 18 to the main bearing chamber 34. The main bearing chamber 34 is defined by a generally cylindrical bore having a larger diameter than the diameter of the resilient chamfered edge 17. The ball race chamber 30 is also defined by a generally cylindrical bore and has a diameter less than the diameter of the main bearing chamber 34. Further, the resilient chamfered edge 17, main bearing chamber 34, and ball race chamber 30 are axially aligned.

Contained and captured in the ball bearing cavity 11 is the ball bearing means 22. With particular reference to FIG. 3, it will be seen that ball bearing means 22 comprises a plurality of small metallic ball bearings 12. These bearings are arranged in a circular configuration to form a ball race 36 which is positioned in the ball race chamber 30. The ball race 36 is thus in rolling engagement with the base member 20. In rolling engagement with the small ball bearings 12 is a single, metallic, main bearing 13. This main bearing 13 is centrally disposed within the main bearing chamber 34 and is rotatably supported between the ball race 36 and the resilient chamfered edge 17. With this arrangement, the ball bearing means 22 are captured in the ball bearing cavity 11 by the resilient chamfered edge 17 which as a diameter smaller than the diameter of the main bearing 13 such that the main bearing 13 is rotatably supported between the ball race 36 and the resilient chamfered edge 17. Further, the main bearing 13 extends outwardly from the bottom surface 18 of the base member 20 for engagement with the ground or a floor surface disposed beneath transfer apparatus 10. This arrangement, therefore, provides for omni-directional movement of apparatus 10.

Base 20 also has means for interchangeably interlocking any number of ball type transfer apparatus together to provide for the fabrication of a ball type transfer apparatus of different dimensions to suit particular needs. Specifically, the interlocking means are comprised of locking pins 38 and pin receiving sockets 40. The locking pins 38 are located on two adjacent sides of the continuous sidewall 28. As shown in FIG. 1, these pins comprise members which extend outwardly from the continuous sidwall 28. Located on the other two sides of the continuous sidewall 28, opposite the locating pins 38, are the pin receiving sockets 40. This arrangement creates a co-operating relationship between the locking pins 38 of one bearing mat and the pin receiving sockets 40 of another bearing mat such that the locking pins of one base member are captured in the pin receiving sockets of another base member to facilitate interchangeable interlocking of successive or adjacent base members. In the preferred embodiment, the pins 38 and receiving sockets 40 are molded into the base member 20 and, as such, are made of the same plastic material as the base member 20; however, any other suitable material could be used and it is contemplated that at least pins 38 could be formed and affixed separately, and that at least sockets 40 could be formed by conventional machining methods.

Figure 8:
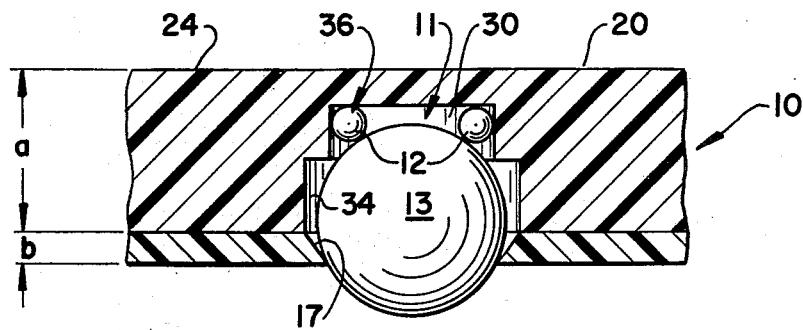
FIG. 8 is a cross-sectional view similar to that of FIG. 3 showing still another alternative embodiment incorporating the concepts of the present invention.

Attention is now particularly directed to FIG. 8 which shows an alternative embodiment of the ball type transfer apparatus 10. This alternative embodiment varies from the previously described embodiment in that the base member 20 is comprised of a two-piece lamination. In this arrangement, one lamina "a" comprises the top surface of the bearing mat 10 while a second lamina "b" comprises the bottom surface of mat 10. It should be noted that in this modified structure the ball race chamber 30 and the main bearing chamber 34 are molded or otherwise formed in the top surface "a" while the resilient chamfered edge 17 is molded or otherwise formed in the bottom surface "b". In this arrangement, the two laminae are fastened together by a heat process, gluing, or by any other convenient fastening means. Laminae "a" and "b" are preferably constructed of the same or similar materials of the type specifically recited hereinabove, although other materials could also be employed.

Turning now to another alternative embodiment of the present invention, attention is directed to the structure shown in FIG. 4. Here, a second ball race 48, comprised of small metallic ball bearings 52, is positioned in rolling engagement between the main bearing 13 and the shoulder 50 formed in the base member 20 at the junction of the main bearing chamber 34 and the ball race chamber 30. This second ball race 48 is thus supported by the main bearing 13 in simultaneous rolling engagement with both ball races 36 and 48.

In the FIG. 3 arrangement, which employs a single ball race, tests have revealed that the bearing mat 10 can easily withstand 2000 pounds of pressure per square foot. On the other hand, when two ball races are employed as in FIG. 4, the bearing mat 10 can easily withstand 6000 pounds of pressure per square foot. Thus, for particularly heavy objects, it may be both necessary and desirable to employ the two-ball race configuration.

Turning now to yet another alternative embodiment of the present invention, attention is directed to FIGS. 2, 5, 6, and 7. In this alternative and for ease of illustration, like components are identified by like numerals and further include a primed (') suffix with new components being identified by new numerals.

In these FIGURES, the structure of this alternative is generally similar to the previous embodiments in that the ball bearing cavity 11' and the ball bearing means 22' have the same general configuration and arrangement as that disclosed hereinabove. That is, the ball bearing cavity 11' is defined by a generally cylindrical ball race chamber 30' located at one end of the cavity 11', a generally cylindrical resilient chamfered edge 17' located at the opposite end of the cavity 11', and a generally cylindrical main bearing chamber 34' located between the ball race chamber 30' and the resilient chamfered edge 17'. Also as in the previous embodiments, the ball bearing means 22' is contained in the ball bearing cavity 11' and is comprised of a ball race 36' positioned in the ball race chamber 30' and a main bearing 13' centrally disposed in the main bearing chamber 34'. However, in the previous embodiments, the ball bearing cavities 11' were directly molded in the base member 20' whereas in this alternative embodiment, the cavities 11' are not molded into the base member 20'.

Here, the base member 20' includes a plurality of spaced-apart ball bearing bosses 62 which extend outwardly from the bottom surface 18' of the base member 20'. These ball bearing bosses 62 are counterbored such that a ball bearing assembly housing 66 which contains the ball bearing means 22' is retained in each of the counterbores 64. With this arrangement, the assembly housing 66 is press fit into the counterbore 64 and the associated ball bearing means 22' may be individually removed from the base member 20' as will be described hereinafter for replacement or repair purposes. Housing 66 is advantageously preferably constructed from a material similar or identical to the plastic materials employable for the base member 20.

As best shown in FIGS. 2 and 5, this arrangement further includes strengthening ribs 60 which extend outwardly from the bottom surface 18' of the base member 20'. These strengthening members 60 extend about the peripheral edge of the base member 20' and also extend among pairs of ball bearing bosses 62. In this embodiment, it is contemplated that the ribs 60 and the bosses 62 are molded into the base member 20' and, as such, are made of the same plastic materials as the base member 20'. Further and as best shown in FIG. 5, the strengthening ribs 60 extend outwardly from the bottom surface 18' substantially the same distance as the ball bearing bosses 62. With this configuration, the ribs 60 function to strengthen both the base member 20' and the ball bearing bosses 62. The ribs 60 also provide means for fabricating a lightweight ball type transfer apparatus 10' in that the base member 20' need not be a solid mass of plastic material as in the previous embodiments. Rather, the base member 20' may be a relatively thin structure with the strengthening ribs 60 supplying the necessary strength and rigidity to the ball type transfer apparatus 10'.

In accordance with another aspect of this alternative arrangement, the ball bearing assembly housing 66 includes a generally circular felt wiping member 70 located in the main bearing chamber 34' positioned between the peripheral edge of the main bearing 13' and the shoulder 50' formed in the housing 66 at the junction of the ball race chamber 30' and the main bearing chamber 34'. This felt wiping member 70 is included in the bearing mat 10' for purposes of preventing the accumulation of dirt and dust in the ball bearing means 22' which could interfere with and prevent satisfactory rotational movement between the bearings. With the inclusion of wiping member 70, any dirt or dust which comes in contact with the main bearing 13' and passes between the resilient chamfered edge 17' and the main bearing 13' will be wiped from the main bearing 13' by the felt wiping member 70.

Figure 6:
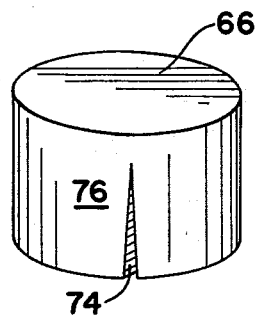
FIG. 6 is a perspective view of the ball bearing assembly housing employed in the FIG. 5 embodiment.

Yet another aspect of this alternative embodiment is the inclusion of a plurality of holes 68 in the base member 20' which extend transversely through the base member between the top surface 24' and the ball bearing boss counterbore 64. Each of the holes 68 is associated with one of the ball bearing boss counterbores 64 such that the ball bearing assembly housing 66 can be pushed out of the ball bearing boss counterbore 64 to permit the housings to be individually removed from the base member 20' for replacement or maintenance purposes. As noted above, the assembly housing 66 is retained in the counterbore 64 by a press fit relationship between them. As best shown in FIG. 6, this press fit is obtained by providing a split 74 in the peripheral wall 76 of the housing 66. The split 74 thus allows the housing 66 to be expanded when the main bearing is forced past the resilient chamfered edge into the housing. The assembly housing is retained in the ball bearing boss by the pressure exerted against the counterbore when the peripheral wall 76 is biased outwardly due to the deformation caused when the main bearing is inserted into the housing 66.

As a slight modification to the structure just described, it is also contemplated that the ball bearing cavities 11 could be advantageously directly molded into the ball bearing bosses 62. This would eliminate at least the need for the ball bearing assembly housings 66.

The feature of these access or knockout holes 68 may also be easily adapted to use in the other embodiments of the invention disclosed hereinabove. In this regard, however, it would be particularly desirable to provide means for selective blocking communication between the holes 68 and the bearing cavities 11 to prevent foreign material from entering the bearing cavities 11 through the holes 68. Removable hole plugs or removable bottom walls in the cavities could be used for this purpose.

The invention has been described with reference to preferred embodiments. Obviously, modifications and alterations will occur to others upon the reading and understanding of the specification. It is my intention to include all such modifications and alterations insofar as they come within the scope of the appended claims or the equivalents thereof.

Having thus described my invention, I now claim:

1. A ball type transfer apparatus particularly adapted for transferring bodies from a first location to a second location comprising in combination:
   a base member;
   ball bearing means for providing omnidirectional rolling engagement with the ground surface beneath the transfer apparatus; and
   interlocking means for interchangeably interlocking any number of ball type transfer apparatus together to provide for the fabrication of ball type transfer apparatus of different dimensions to suit particular needs;
   said base member having a plurality of spaced-apart ball bearing cavities, each of which contains a ball bearing means that is resiliently captured in said ball bearing cavity and freely rotatable relative to said base member, with a portion of said ball bearing means protruding outwardly of the lower face of said base member such that the ball bearing means supports the base member above the ground surface and provides for omnidirectional rolling engagement with the ground surface beneath the ball type transfer apparatus;
   said base member being a generally planar member including a top surface, a bottom surface and a continuous sidewall, said top and bottom surfaces being substantially opposed to each other, said bottom surface further including a plurality of spaced-apart ball bearing cavities, each of which contains a ball bearing means which is freely rotatable relative to said base member;
   each of said bearing cavities being defined by a ball race chamber at one end of said cavity, a resilient chamfered edge at the opposite end of said cavity, and a main bearing chamber between said ball race chamber and said resilient chamfered edge;
   said resilient chamfered edge being located at said bottom surface of said base member and extending inwardly from said bottom surface to said main bearing chamber;
   said main bearing chamber being defined by a generally cylindrical bore having a larger diameter than the diameter of said resilient chamfered edge;
   said ball race chamber being defined by a generally cylindrical bore having a diameter less than the diameter of said main bearing chamber;
   said resilient chamfered edge, main bearing chamber the ball race chamber being axially aligned;
   said ball bearing means being comprised of a ball race and a main bearing, both captured in said ball bearing cavity, said ball race being positioned in said ball race chamber in rolling engagement with said base member, said main bearing being rotatably supported between said ball race and said resilient chamfered edge of said base member, said ball bearing means being resiliently captured in said ball bearing cavity by said resilient chamfered edge which has a diameter smaller than the diameter of said main bearing such that said main bearing is held in said ball bearing cavity between said ball race and said resilient chamfered edge;
   said interlocking means being comprised of outwardly extending integral locking pins located on two adjacent sides of said continuous sidewall and inwardly extending pin receiving sockets located on the other two adjacent sides of said continuous sidewall;
   said locking pins each having an elongated shaft portion terminating in an outermost head portion enlarged from said shaft portion, said locking pins adapted to be closely received in the pin receiving sockets of other similar base members whereby said head portions may retainingly maintain said base members in at least one of closely spaced unitary side by side and end to end relationships to each other.

2. The ball type transfer apparatus of claim 1 wherein said base member is comprised of a two-piece lamination, one of the laminae comprising said top surface and including said plurality of spaced-apart ball race chambers and said adjacent axially aligned main bearing chambers;
   the second of the two laminae comprising said bottom surface and including said plurality of axially aligned, spaced-apart, resilient chamfered edges.

3. A ball type transfer apparatus particularly adapted for transferring bodies from a first location to a second location comprising in combination:
   a base member; and ball bearing means for providing omnidirectional rolling engagement with the ground surface beneath the transfer apparatus;

said base member being a generally planar member including a top surface, a bottom surface and a continuous sidewall, said top and bottom surfaces being substantially opposed to each other, said bottom surface further including a plurality of spaced-apart ball bearing bosses each of which contains a ball bearing means that is resiliently captured in said ball bearing boss and freely rotatable relative to said base member, with a portion of said ball bearing means protruding outwardly of the lower face of said ball bearing boss such that the ball bearing means supports the base member above the ground surface and provides for omnidirectional rolling engagement with the ground surface beneath the ball type transfer apparatus;

each of said ball bearing bosses extending outwardly from the bottom surface of said base member substantially the same distance;

each of said ball bearing bosses including a ball bearing cavity for the containment of a ball bearing means, said cavity being defined by a ball race chamber at one end of said cavity, a resilient chamfered edge at the opposite end of said cavity, and a main bearing chamber between said ball race chamber and said resilient chamfered edge;

said resilient chamfered edge being located at the outermost end of said ball bearing boss and extending inwardly from said outermost end to said main bearing chamber;

said main bearing chamber being defined by a generally cylindrical bore having a larger diameter than the diameter of said resilient chamfered edge;

said ball race chamber being defined by a generally cylindrical bore having a diameter less than the diameter of said main bearing chamber;

said resilient chamfered edge, main bearing chamber and ball race chamber being axially aligned;

said ball bearing means being comprised of a ball race and a main bearing, both captured in said ball bearing boss, said ball race being positioned in said ball race chamber in rolling engagement with said base member, said main bearing being rotatably supported between said ball race and said resilient chamfered edge of said ball bearing boss, said ball bearing means being resiliently captured in said ball bearing boss by said resilient chamfered edge which has a diameter smaller than the diameter of said main bearing such that said single ball bearing is resiliently held in said ball bearing boss between said ball race and said resilient chamfered edge; and said base member further including strengthening ribs extending outwardly from said bottom surface, said ribs extending outwardly substantially the same distance as said ball bearing bosses, said ribs extending about the peripheral edge of said base member at said bottom surface and also extending among pairs of ball bearing bosses.

4. The ball type transfer apparatus of claim 3 wherein said base member has means for interchangeably interlocking any number of ball type transfer apparatus together to provide for the fabrication of ball type transfer apparatus of different dimensions to suit particular needs;

said interlocking means being comprised of outwardly extending integral locking pins located on two adjacent peripheral strengthening ribs of said base member and inwardly extending pin receiving sockets located on the other two adjacent peripheral strengthening ribs of said base member;

said locking pins each having an elongated shaft portion terminating in an outermost head portion enlarged from said shaft portion, said locking pins adapted to be closely received in the pin receiving sockets of other similar base members whereby said head portions may retainingly maintain said base members in at least one of closely spaced unitary side by side and end to end relationship to each other.

5. A ball type transfer apparatus particularly adapted for transferring bodies from a first location to a second location comprising in combination:

a base member;

a ball bearing assembly housing; and ball bearing means for providing omnidirectional rolling engagement with the ground surface beneath the transfer apparatus;

said base member being a generally planar member including a top surface, a bottom surface and a continuous sidewall, said top and bottom surfaces being substantially opposed to each other, said bottom surface further including a plurality of spaced-apart ball bearing bosses each of which contains a ball bearing means such that the ball bearing means supports the base member above the ground surface and provides for ominidirectional rolling engagement with the ground surface beneath the ball type transfer apparatus;

each of said ball bearing bosses extending outwardly from the bottom surface of said base member substantially the same distance;

each of said ball bearing bosses being counterbored, said counterbore extending inwardly from said outermost end of said ball bearing boss;

each of said counterbores containing a ball bearing assembly being comprised of a ball bearing assembly housing and a ball bearing means which is freely rotatable relative to said housing;

said ball bearing assembly housing being generally cylindrically shaped, having an outside diameter slightly less than that of said counterbore such that said housing is held in said counterbore by a press fit;

said housing having a ball race chamber at one of its ends, a resilient chamfered edge at its opposite end, and a main bearing chamber between said ball race chamber and said resilient chamfered edge;

said resilient chamfered edge being located at the outermost end of said housing and extending inwardly from said outermost end to said main bearing chamber;

said main bearing chamber being defined by a generally cylindrical bore having a larger diameter than the diameter of said resilient chamfered edge;

said ball race chamber being defined by a generally cylindrical bore having a diameter less than the diameter of said main bearing chamber;

said resilient chamfered edge, main bearing chamber and ball race chamber being axially aligned;

said ball bearing means being comprised of a ball race and a main bearing, both captured in said ball bearing assembly housing, said ball race being positioned in said ball race chamber in rolling engagement with said housing, said main bearing being rotatably supported between said ball race and said resilient chamfered edge of said ball bearing assembly housing, said ball bearing means being resiliently captured in said ball bearing housing by said resilient chamfered edge which has a diameter smaller than the diameter of said main bearing such that said single ball bearing is resiliently held in said ball bearing housing between said ball race and said resilient chamfered edge; and said base member further including a plurality of holes extending transversely through said base member between said top surface and said ball bearing boss counterbore, each of said holes being of a smaller diameter than the diameter of said ball bearing boss counterbore thus providing a means for removing said ball bearing assembly housings from said ball bearing boss counterbores for replacement purposes.

6. The ball type transfer apparatus of claim 5 further including a second ball race located in said single ball chamber, positioned in rolling engagement between said main bearing and the shoulder formed in said base member at the junction of said main bearing chamber and said ball race chamber, said second ball race thus being supported by said main bearing and said main bearing thereby being in simultaneous rolling engagement with both ball races.

7. A ball type transfer apparatus particularly adapted for transferring bodies from a first location to a second location comprising in combination:

a base member;
a ball bearing assembly housing; and
ball bearing means for providing omnidirectional rolling engagement with the ground surface beneath the transfer apparatus;
said base member being a generally planar member including a top surface, a bottom surface and a continuous sidewall, said top and bottom surfaces being substantially opposed to each other, said bottom surface further including a plurality of spaced-apart ball bearing bosses each of which contains a ball bearing means such that the ball bearing means supports the base member above the ground surface and provides for omnidirectional rolling engagement with the ground surface beneath the ball type transfer apparatus;
each of said ball bearing bosses extending outwardly from the bottom surface of said base member substantially the same distance;
each of said ball bearing bosses being counterbored, said counterbore extending inwardly from said outermost end of said ball bearing boss;
each of said counterbores containing a ball bearing assembly being comprised of a ball bearing assembly housing and a ball bearing means which is freely rotatable relative to said housing;
said ball bearing assembly housing being generally cylindrically shaped, having an outside diameter slightly less than that of said counterbore such that said housing is held in said counterbore by a press fit;
said housing having a ball race chamber at one of its ends, a resilient chamfered edge at its opposite end, and a main bearing chamber between said ball race chamber and said resilient chamfered edge;
said resilient chamfered edge being located at the outermost end of said housing and extending inwardly from said outermost end to said main bearing chamber;
said main bearing chamber being defined by a generally cylindrical bore having a larger diameter than the diameter of said resilient chamfered edge;
said ball race chamber being defined by a generally cylindrical bore having a diameter less than the diameter of said main bearing chamber;
said resilient chamfered edge, main bearing chamber and ball race chamber being axially aligned;
said ball bearing means being comprised of a ball race and a main bearing, both captured in said ball bearing assembly housing, said ball race being positioned in said ball race chamber in rolling engagement with said housing, said main bearing being rotatably supported between said ball race and said resilient chamfered edge of said ball bearing assembly housing, said ball bearing means being resiliently captured in said ball bearing housing by said resiliently chamfered edge which has a diameter smaller than the diameter of said main bearing such that said single ball bearing is resiliently held in said ball bearing housing between said ball race and said resilient chamfered edge;
said housing further including a circular felt wiping member located in said main bearing chamber positioned between said main bearing and the shoulder formed in said ball bearing assembly housing at the junction of said main bearing chamber and said ball race chamber, said circular felt wiping member being in contact with said single ball bearing thus preventing the accumulation of dirt and dust in said ball bearing means; and
said base member further including a plurality of holes extending transversely through said base member between said top surface and said ball bearing boss counterbore, each of said holes being of a smaller diameter than the diameter of said ball bearing boss counterbore thus providing a means for removing said ball bearing assembly housings from said ball bearing boss counterbores for replacement purposes.

8. A ball type transfer apparatus particularly adapted for transferring bodies from a first location to a second location comprising in combination:

a base member;
a ball bearing assembly housing; and
ball bearing means for providing omnidirectional rolling engagement with the ground surface beneath the transfer apparatus;
said base member being a generally planar member including a top surface, a bottom surface and a continuous sidewall, said top and bottom surfaces being substantially opposed to each other, said bottom surface further including a plurality of spaced-apart ball bearing bosses each of which contains a ball bearing means such that the ball bearing means supports the base member above the ground surface and provides for omnidirectional rolling engagement with the ground surface beneath the ball type transfer apparatus;
each of said ball bearing bosses extending outwardly from the bottom surface of said base member substantially the same distance;
each of said ball bearing bosses being counterbored, said counterbore extending inwardly from said outermost end of said ball bearing boss;

each of said counterbores containing a ball bearing assembly being comprised of a ball bearing assembly housing and a ball bearing means which is freely rotatable relative to said housing;

said ball bearing assembly housing being generally cylindrically shaped, having an outside diameter slightly less than that of said counterbore such that said housing is held in said counterbore by a press fit;

said housing having a ball race chamber at one of its ends, a resilient chamfered edge at its opposite end, and a main bearing chamber between said ball race chamber and said resilient chamfered edge;

said resilient chamfered edge being located at the outermost end of said housing and extending inwardly from said outermost end to said main bearing chamber;

said main bearing chamber being defined by a generally cylindrical bore having a larger diameter than the diameter of said resilient chamfered edge;

said ball race chamber being defined by a generally cylindrical bore having a diameter less than the diameter of said main bearing chamber;

said resilient chamfered edge, main bearing chamber the ball race chamber being axially aligned;

said ball bearing means being comprised of a ball race and a main bearing, both captured in said ball bearing assembly housing, said ball race being positioned in said ball race chamber in rolling engagement with said housing, said main bearing being rotatably supported between said ball race and said resilient chamfered edge of said ball bearing assembly housing, said ball bearing means being resiliently captured in said ball bearing housing by said resilient chamfered edge which has a diameter smaller than the diameter of said main bearing such that said single ball bearing is resiliently held in said ball bearing housing between said ball race and said resilient chamfered edge;

said housing further including a split in the peripheral wall of said housing, said split extending from the outermost end of said housing partially up the side of said housing, said split thus allowing said housing to be deformed when said main bearing is forced into said housing past said resilient chamfered edge and thus also providing a means for expanding said housing within said ball bearing boss such that said housing is held in said ball bearing boss by the pressure exerted against the walls of the counterbore of said ball bearing boss when said housing is deformed by the inclusion of said main bearing in said housing; and said base member further including a plurality of holes extending transversely through said base member between said top surface and said ball bearing boss counterbore, each of said holes being of a smaller diameter than the diameter of said ball bearing boss counterbore thus providing a means for removing said ball bearing assembly housings from said ball bearing boss counterbores for replacement purposes.

* * * * *